Sept. 21, 1926.
C. E. GRIFFITHS
1,600,759
FILM ACTUATING ATTACHMENT TO ROLL FILM CAMERAS
Filed Dec. 30, 1925
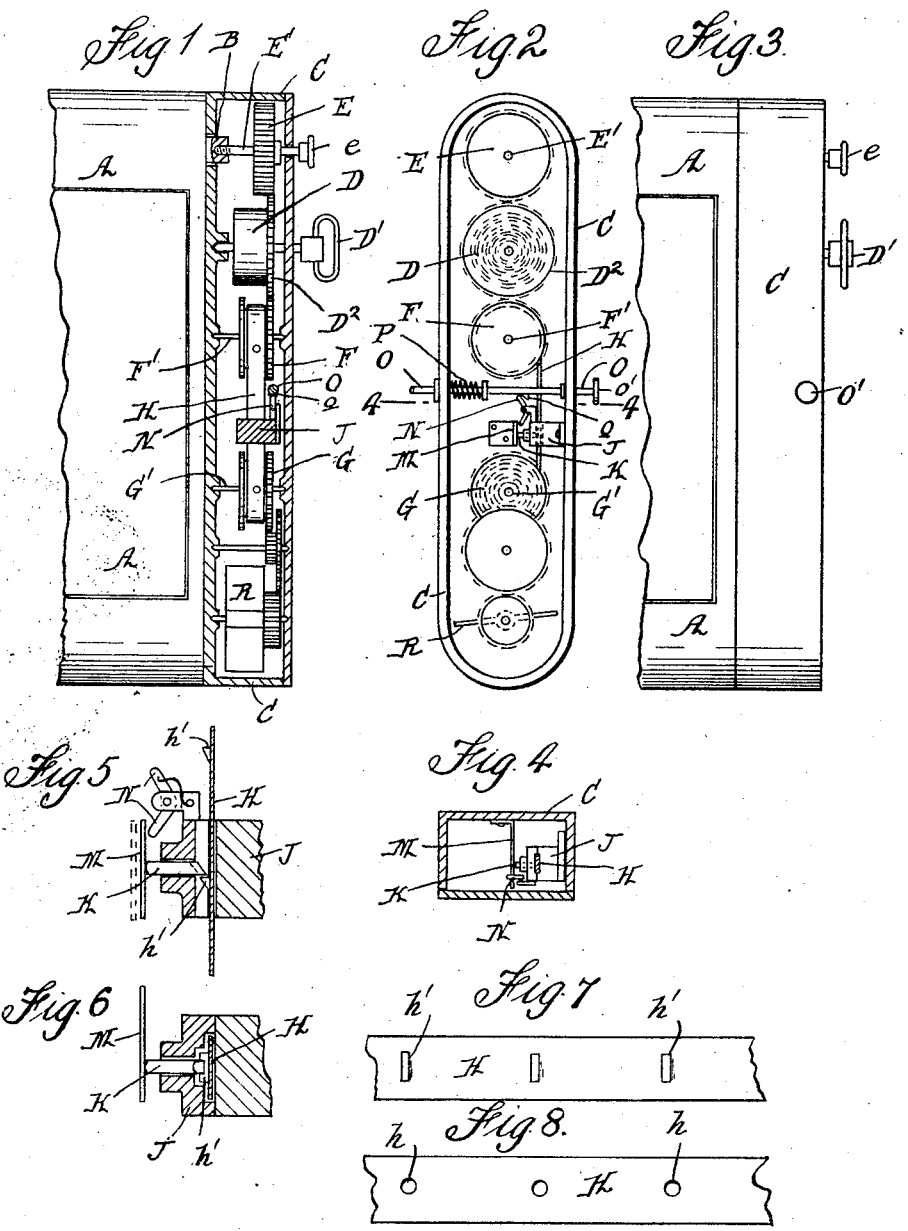
Inventor:
Charles Ernest Griffiths
By
Attorney Patented Sept. 21, 1926.

1,600,759

UNITED STATES PATENT OFFICE.

CHARLES ERNEST GRIFFITHS, OF WELLINGTON, NEW ZEALAND.

FILM-ACTUATING ATTACHMENT TO ROLL-FILM CAMERAS.

Application filed December 30, 1925, Serial No. 78,397, and in New Zealand June 2, 1925.

This invention has reference to the well known type of cameras using roll films for exposure purposes and which films are rolled from one spool to another across the exposure opening in order that the length of the film may be exposed in consecutive sections. This travel of the film is obtained by the rotation of one of the spools which is mounted in special journals, one of which is extended to the outside of the camera in the form of a key.

In the use of the camera it is therefore necessary to actuate this spool for each exposure in order that a new portion of the film may be moved into exposure position and this may be done after each exposure has been made in order thus to have the film ready for the next exposure.

It is thus possible to neglect to alter the film on occasions so that two exposures may be made upon the same section or to forget whether an alteration has been effected; and it is also possible, in order to ensure against a double exposure on one section, to move the film, when already an unexposed section was in exposure position, thereby wasting that section.

The present invention has been devised with the object of providing means for attachment to the camera by which the spool may be turned automatically the requisite amount for each exposure, by merely pressing a finger piece. This finger piece or push button is capable of being combined with the shutter operating push button of the camera in order that the one operation shall make the exposure and feed the film for the next exposure. The said film movement however only occurs after the exposure has finished.

The said means are designed to turn the spool by the action of a spring driven motor, such action being checked by special control means that form the principal feature of novelty in this invention. The said control means are of such a nature that they are actuated by the said push button to release the motor and after the film has travelled the required distance, to stop the motor and thus arrest further travel of the film.

A suitable manner of carrying out the invention is illustrated in the accompanying drawings in conjunction with the control means forming its special feature.

In such drawings:—

Figure 1 is a rear elevation of one side of a camera, showing the attachment in position thereon, the casing of the attachment being shown in section.

Figure 2 is a side elevation of the attachment, the casing cover being removed.

Figure 3 is a rear elevation of the parts shown in Figure 1.

Figure 4 is a detail horizontal section on the line 4—4 of Figure 2.

Figures 5 to 8 are enlarged detail views of parts that will be hereinafter more fully described.

A is the camera which is made in any of the approved ways and B is the end trunnion of the spool carrying frame, extending through one side edge of the camera, also in the well known way, and by the rotation of which the spool is turned to wind the film upon it in the feeding of the film across the camera exposure opening.

The attachment forming this invention is designed to work in conjunction with such trunnion B.

The said attachment comprises a casing C which is made of approved material and is fixed to the edge of the camera through which the trunnion B extends. This casing is preferably made of a depth and length to approximate with the depth and length of the camera and thereby to form a symmetrical whole therewith as shown in Figure 3. It is made of the width necessary to receive the operating mechanism, and its two end walls are made as bearing plates in which the several spindles of such mechanism are journalled.

Mounted in the casing C is a spring drum D of ordinary clock spring design, such drum being tensioned by means of the winding arbor D' situated outside the casing and having a gear wheel D² combined therewith. This gear wheel D² meshes with a gear wheel E fixed upon a spindle E' which is locked to the spool journal B in any approved manner so that the rotation of the spindle will convey rotation to the spool. If necessary the said spindle E' may be mounted in its casing so that it may be moved longitudinally to pull the journal B outward in order to free the spool and to push it in again in the manner well known in camera construction and operation, and for this purpose its outer end may be extended beyond the casing and provided with a head $e$ by which it may be grasped.

The spring tension of the drum D is designed to turn the journal B in the direction to wind the film from the unexposed to the exposed spool and its capacity may be made sufficiently great to provide for a number of film lengths being dealt with on the one winding of the drum.

The said action of this drum D is however controlled by the special means provided and forming the particular feature of novelty in this invention.

These means comprise two drums F and G that are mounted on the respective spindles F' and G' arranged a distance apart within the casing C. The drum F is geared with the gear wheel $D^2$ of the spring drum D while the drum G is a spring drum having a spring coiled within it and serving to tension it. This spring, however, when fully tensioned, is of less strength than that of the main spring drum D. A band or belt H is provided to extend between the drums F and G and has its respective ends made fast to such drums so that it will unwind from one drum and wind on the other when either drum is rotated in the necessary direction.

This band H is made of any suitable material of approved flexible nature but is preferably of steel tape form as shown in the drawings. It is so wound and the spring drum G so adjusted relatively to the main spool operating drum D that the turning of this latter drum under the influence of its spring will wind the band on to the drum F against the action of the spring drum G, thereby tensioning drum G to re-wind the band upon it when the band is released from the action of the main spring drum D.

Consequently any check in the movement of the band to wind upon the drum F will serve to hold the main spring drum from rotation under the action of its spring and thereby to keep the camera film spool stationary.

The invention is designed to provide for the band H being engaged by means such that they may be operated to release it so that main spring drum D may rotate to allow for the film being moved the distance necessary to bring the next exposure section into operation and then to reengage the band and stop further movement of the film.

The said band is therefore made with suitable stops arranged at the requisite intervals in its length and formed either by apertures $h$ piercing the band, as in Figure 8, or by small bars $h'$ affixed to it as in Figures 5, 6 and 7. The band as it passes from the drum F to the drum G is carried through a guide block J affixed to the inside of the casing C. Projecting into this guide block, at right angles to the band, is a pin K that is affixed to a spring arm M by means of which the pin is kept normally forced in so that its end makes contact with the band surface, in the case where the band is formed with apertures, and adjacent to the surface where it is provided with the bars.

Mounted on the guide block J as shown more particularly in Figures 4 and 5 is a spring controlled bell crank lever N one arm of which engages behind the spring M so that the turning of the lever in one direction will move the spring back and draw the pin K away from the band, while its other arm extends upwards. A rod O is mounted to slide across the casing C, above this upper arm, and to project beyond its rear side where it is provided with a finger piece or button O', and such rod is spring controlled by the compressor spring P to keep the rod forced to one side. It is also formed with a ratchet tooth $o$ on its underside which is designed, as the rod is pushed in against its spring, to move across the upper arm of the bell crank lever N and turn it idly backward, and then, when the rod is released and its spring pushes it back, to engage the said upper arm and turn the lever in order that the spring M shall be forced back the necessary amount to withdraw the pin K, and then to trip across the top of the bell crank and allow the spring M to move in again.

Thus the pin K is moved out from engagement with the stop on the band H so that the mechanism is released and immediately moves in to engage the band surface in order that it will engage the next stop $h$ or $h'$ (as the case may be) and stop the band's further movement and also stop the further travel of the whole mechanism. These stops $h$ or $h'$ are disposed upon the band the necessary distances apart to allow of the requisite travel of the film before the travel is stopped, on each operation, and they are also disposed at differential distances to compensate for the less travel necessary for the film winding spool as the film becomes wound thereon and its diameter increases with the winding of each section.

When the whole film has been used and the band H is wound on to the drum F, it has to be rewound on to its spring drum G to re-set the mechanism for a fresh film. This is done by releasing the drum F from mesh with the main spring drum D so that the spring of the drum G may then act freely and re-wind the band, the button O' being at the same time actuated to free the band from its detaining pin K. For this purpose the spring drum D has its spindle so mounted that a pull on the winding arbor D' will pull the drum out from mesh with the drum F.

This movement may also be used to free the gear wheel E so that the spool spindle E' may be turned to wind the film wrappings upon the spool and bring the first exposure length into position, the mechanism then being set for the automatic winding of the film by moving the spring drum D back into mesh with the gear wheel E and drum F.

If desired, and when stops h' are used upon the band, each stop may have its back edge tapered, and the end of the pin K also made taper, as shown in Figure 5, so that the stops will slip over the pin end as the band travels back on to its spring drum G and thereby save any necessity for actuating the button O' to permit of such travel.

In order to control or brake the actions of the various mechanisms involved and to prevent shock to the parts through the sudden stoppages, an ordinary rotating vane governor R may be provided and connected with the drum G through a suitable chain of gear wheels.

The operating rod O may also be continued to extend through the front of the casing so that it may be linked up with the ordinary and well known Antinius release for operating the exposure shutter of the camera. When thus linked up only the one action is necessary to operate the shutter and to change the film length, as the inward push on the button O' will perform the exposure, and its release to allow the rod to return under the action of its spring P will cause the film change to be effected.

I claim:—

1. A film-feed control for cameras, comprising a tape having spaced stops; means for actuating the tape in conformity with the film; a detent adapted to engage said stops and arrest the travel of the tape; a casing or chamber wherein the tape, its actuating means and the detent are disposed; and a push-rod mounted in said casing to release said detent.

2. A film-feed control for cameras, comprising a tape having spaced stops; means for actuating the tape in conformity with the film; a detent adapted to engage said stops and arrest the travel of the tape; a casing or chamber wherein the tape, its actuating means and the detent are disposed; a bell-crank arranged in said casing for co-action with the detent to release the same; and a push-member mounted in the casing and adapted to idly engage the bell-crank during its movement in one direction and to positively engage and actuate said bell-crank during its movement in the other direction.

3. A film-feed control, according to claim 2, in which the push-member consists of a spring-loaded rod having a tooth which rides idly over the bell-crank when the rod moves in one direction and engages and rocks said bell-crank during its movement in the other direction.

4. A film-feed control for cameras, comprising a tape having spaced stops; means for actuating the tape in accordance with the film; a pin adapted to engage said stops and arrest the travel of the tape; a spring arm by which said pin is carried; a member adapted to engage said arm so as to withdraw the pin; a casing wherein the above-named parts are disposed; and a push member mounted in said casing for actuating said arm-engaging member.

5. A film-feed control for cameras, comprising a tape having spaced stops; means for actuating the tape in accordance with the film; a pin adapted to engage said stops and arrest the travel of the tape; a spring arm by which said pin is carried; a bell-crank adapted to engage said arm so as to withdraw the pin; a casing wherein the above-named parts are disposed; and a push-rod mounted in said casing for actuating said bell-crank.

6. A film-feed control for cameras, comprising a tape having spaced stops; means for actuating the tape in accordance with the film; a pin adapted to engage said stops and arrest the travel of the tape; a spring arm by which said pin is carried; a bell-crank adapted to engage said arm so as to withdraw the pin; and a push-rod having a tooth which rides idly over the bell-crank during its movement in one direction and which positively engages and rocks said bell-crank during its movement in the other direction.

7. A film-feed control for cameras, comprising a tape adapted to be actuated in conformity with the film and having spaced stop blocks secured to one surface; a detent engageable with said blocks to arrest the travel of the tape in one direction, said detent and blocks having their coacting portions beveled to permit the blocks to ride idly past the detent when the tape travels in the other direction; and means for releasing said detent.

8. A film-feed control for cameras, comprising a tape adapted to be actuated in conformity with the film and having spaced stop blocks secured to one surface; a pin engageable with said blocks to arrest the travel of the tape in one direction, said pin and blocks having their coacting portions beveled to permit the blocks to ride idly past the pin when the tape travels in the other direction; a spring arm carrying the pin and normally pressing it toward the tape; and means engageable with said arm to move it and the pin away from the tape.

In testimony whereof, I affix my signature.

CHARLES ERNEST GRIFFITHS.